Figures 1, 2:
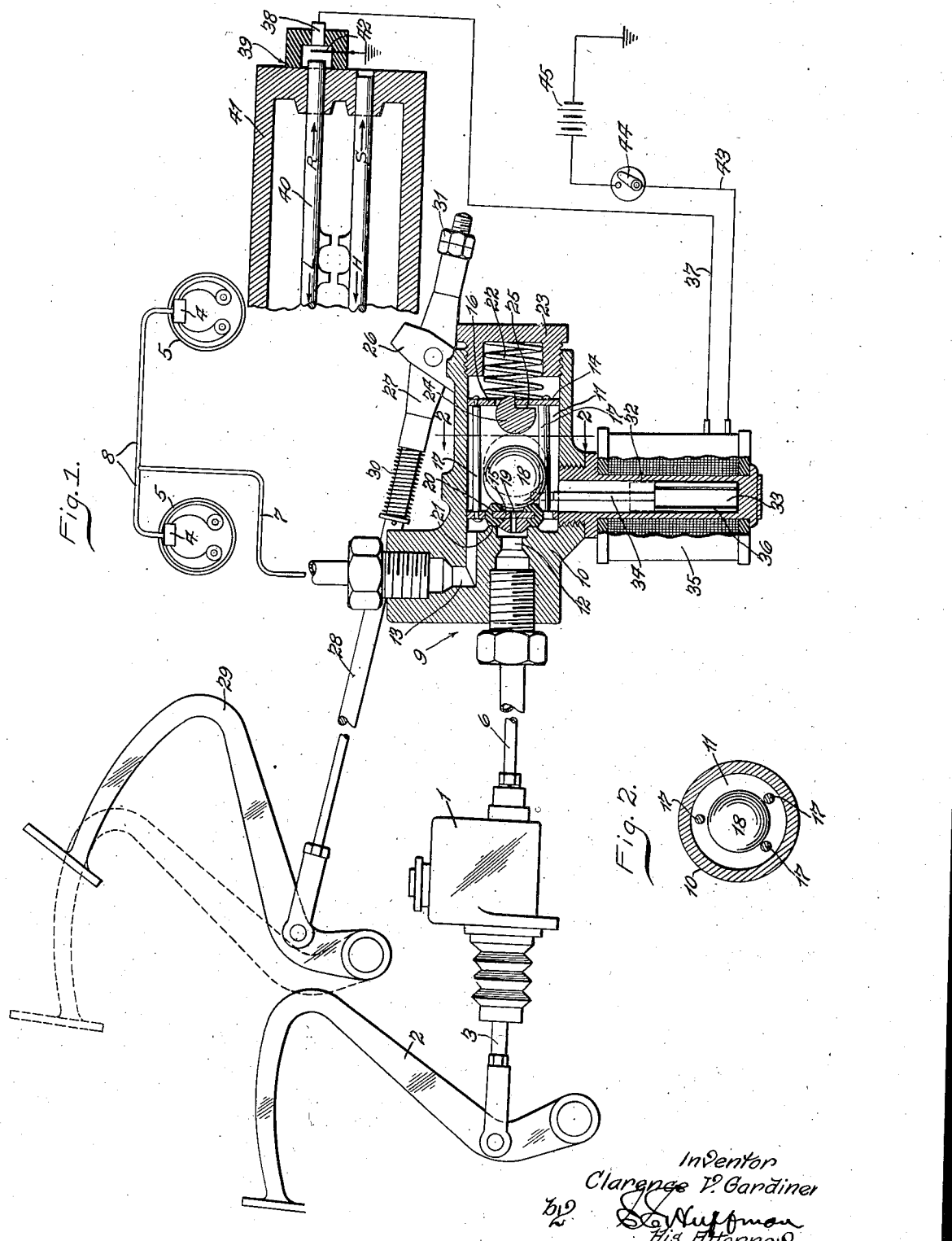

Aug. 5, 1941.    C. V. GARDINER    2,251,787
ELECTRICALLY OPERATED BRAKE CONTROL MECHANISM
Filed Dec. 30, 1939

Inventor
Clarence V. Gardiner
by
His Attorney

Patented Aug. 5, 1941

2,251,787

UNITED STATES PATENT OFFICE 2,251,787

ELECTRICALLY OPERATED BRAKE CONTROL MECHANISM

Clarence V. Gardiner, Birmingham, Mich., assignor to Wagner Electric Corporation, St. Louis, Mo., a corporation of Delaware Application December 30, 1939, Serial No. 311,855

10 Claims. (Cl. 192—4)

My invention relates to vehicle brakes and more particularly to improved control means for holding said brakes applied under certain conditions.

One of the objects of my invention is to provide electrically-operated control means for disabling an automatically operable brake holding means when a control element of the vehicle is in a predetermined position.

A more specific object of my invention is to provide an auxiliary electrically-operated disabling means for an inertia and gravity controlled brake holding means which will be operable only when the change speed gearing of the vehicle is placed in reverse gear position.

Other objects of my invention will become apparent from the following description taken in connection with the accompanying drawings in which Figure 1 is a schematic view of a brake holding means and control therefor which embodies my invention, said brake holding means being shown in cross section, and Figure 2 is a cross-sectional view taken on the line 2—2 through the brake holding valve.

I have shown my invention embodied in a hydraulic brake actuating system but it is by way of example only as it may be embodied in other types of brake actuating systems if desired.

Referring to the drawing in detail, the master cylinder device 1 for the brake actuating system is of the usual type comprising a cylinder and piston (not shown) whereby actuation of the brake pedal 2 and piston rod 3 will create fluid pressure to actuate the brakes. The master cylinder communicates with the fluid motors 4 of the brake assemblies 5 by way of conduits 6 and 7 and branch conduits 8. Interposed between conduits 6 and 7 is a brake holding valve mechanism 9 whereby fluid under pressure can be trapped in the fluid motors to maintain the brakes applied without holding the operator's foot on the brake pedal, thus permitting it to be free for other uses such as operating the accelerator or the starter.

The brake holding valve mechanism comprises a casing 10 provided with a cylindrical chamber 11 which is connected to the conduit 6 leading from the master cylinder device by a passage 12 and to a conduit 7 leading to the fluid motors by a passage 13. Within the chamber 11 is a cage 14 comprising end plates 15 and 16 connected together by rods 17, the lower two of which form a track for an inertia and gravity controlled ball 18. The end plate 15 is provided with a central opening 19 and carries an annular valve element 20 of rubber or other suitable material. One side of this valve element cooperates with a valve seat 21 surrounding the end of passage 12 and the other side cooperates with the ball 18. The cage is biased to a position where the valve element engages the valve seat by a spring 22 interposed between the end plate 16 and the plug 23 closing the outer end of the chamber 11.

Mounted in the casing is a rotatable member 24 having a cam surface 25 for engaging the end plate 16 and moving the cage against the spring and to a position where the valve element is disengaged from the valve seat, thus permitting fluid to flow in both directions between the passages 12 and 13, notwithstanding the ball may be in engagement with the valve element. The exterior end of the rotatable element has secured thereto an arm 26 which is connected to a sleeve 27 mounted on the rod 28 movable with the vehicle clutch pedal 29. The sleeve is connected to the rod by being biased by a spring 30 against an adjusting nut 31 on the end of the rod.

The holding valve mechanism is preferably so mounted on the vehicle that when the vehicle is on a horizontal roadway the track for the ball will be slightly inclined so that the ball will engage the valve element 20. When the clutch pedal is in clutch-engaged position the rotatable member 24 will hold the cage in a position to disengage the valve element from the seat 21. As already stated with this position of the cage the brakes can be applied and released at will by the brake pedal since fluid can flow in both directions between the passages 12 and 13.

If the vehicle should be brought to a stopped position facing upwardly on an inclined roadway and the clutch disengaged, the parts of the valve mechanism will assume the positions shown. If the brakes have been applied, they will be held applied since the valve element 20 engages the seat and the action of gravity rolls the ball into engagement with the valve element, thus trapping fluid in the fluid motors and holding the brakes applied. If the brakes have not been applied, they may be applied since the ball can be unseated by fluid pressure from the master cylinder. When the brakes are held applied the operator can remove his foot from the brake pedal.

When it is desired to start the vehicle, the brakes will be released simultaneously with the engagement of the clutch. As the clutch pedal moves rearwardly, the cam surface of rotatable member will move the cage against the action of the spring, thus moving the valve element off the seat 21 and permitting fluid to flow from passage 13 to passage 12 and return to the master cylinder. If the vehicle should be moving forwardly when the clutch pedal is in clutch-disengaged position and the brakes are applied, they will not be held applied since the action of inertia caused by deceleration of the vehicle will cause the ball to move to a position away from the valve element as shown in dotted lines. Fluid is then free to flow in both directions through the valve element.

In a vehicle which has its brakes equipped with a brake holding means of the type described there may be circumstances wherein some difficulty is present in maneuvering the vehicle under certain conditions such as permitting the vehicle to move backward down an incline with the clutch disengaged since then the brakes cannot be released in accordance with the release of the brake pedal due to the operative condition of the valve mechanism. In accordance with my invention I have provided means controlled by a position of the elements of the change speed gearing for disabling the brake holding valve mechanism.

As shown in the drawing the bottom wall of the chamber 11 of the casing has screwed therein a downwardly extending cylindrical member 32 closed at its outer end and communicating with the chamber. Within the cylindrical member is a plunger 33 of magnetic material having a rod 34 carried thereby. The weight of the plunger normally holds it at the closed end of the cylinder member and when in such position the free end of rod 34 lies below ball 18. Surrounding the cylinder is a solenoid 35 which when energized will move the plunger upwardly and cause the end of rod 34 to engage ball 18 and positively move it off the valve element if engaged therewith or maintain it disengaged from the valve element if not engaged. In order to permit free movement of the plunger in the fluid, the plunger is provided with a longitudinal passage 36 which permits fluid to flow past the plunger as it moves.

One end of the wiring of the solenoid is connected by a conductor 37 to a contact element 38 of a switch 39 associated with the low and reverse speed gearing shifting rod 40 mounted on the casing 41 of the change speed gearing. The other contact element 42 of the switch is a grounded yieldable leaf spring so mounted as to be forced into engagement with the contact element 38 when rod 40 is moved to a position placing the gearing in reverse speed condition. The other end of the solenoid wiring is connected by a conductor 43 through a switch 44 to one terminal of a battery, the other terminal of which is grounded to complete the circuit. The switch 44 is preferably the usual ignition switch in order that the circuit will be broken when the main ignition circuit of the vehicle is broken.

By means of the plunger, solenoid and circuit just described it is apparent that when the change speed gearing is placed in reverse gear position the circuit will be closed, the solenoid energized and the plunger moved to a position to unseat the ball or hold it unseated. Thus the holding valve mechanism will be inoperative and the brakes can be controlled in the same manner as though the valve mechanism were not present in the brake system. If the vehicle should be facing upwardly on an incline and it is desired to back it up, the placing of the gearing in reverse will operate the solenoid and there will be no possibility of holding the brakes applied when the clutch is held disengaged. Thus the vehicle can roll backward in the direction desired.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a vehicle provided with a brake actuating mechanism and with change speed gearing, means for holding the brakes applied, means operable by a control element of the vehicle for causing said holding means to be inoperative, other means comprising a solenoid and a switch controlled electrical circuit for causing said holding means to be inoperative notwithstanding said control element of the vehicle is in a position not causing the holding means to be inoperative, and means for operating said switch only when the gearing is in reverse gear position.

2. In a vehicle provided with a clutch mechanism having a control element and with a brake actuating mechanism, means for holding the brakes applied comprising a member caused to be operative by gravity and inoperative by the action of inertia during deceleration of the vehicle, means operable by the clutch control element of the vehicle when in clutch-engaged position for causing said member to be ineffective and the holding means to be inoperative, said holding means permitted to be operative when the clutch is disengaged, and other means comprising a solenoid and a switch-controlled electrical circuit for causing said holding means to be inoperative notwithstanding said clutch control element of the vehicle is in clutch-disengaged position.

3. In a vehicle provided with a clutch mechanism having a control element, with a change speed gearing and with a brake actuating mechanism, means for holding the brakes applied, means operable by the clutch control element of the vehicle when in clutch engaged position for causing said holding means to be inoperative, said holding means permitted to be operative when the clutch is disengaged, means comprising a solenoid for causing said holding means to be inoperative notwithstanding said clutch control element of the vehicle is in clutch-disengaged position, an electrical circuit for the solenoid including a switch, and means for closing the switch and energizing the solenoid only when the change speed gearing is in reverse gear position.

4. In a vehicle provided with braking mechanism and a change speed gearing, gravity-controlled means for preventing release of the brakes from applied position, said gravity-controlled means being inoperative under the influence of deceleration of the vehicle, means comprising a solenoid for causing the release preventing means to be inoperative notwithstanding the action of gravity thereon tending to cause it to be operative, and an electrical circuit including a switch controlled by an element of the change speed gearing when in reverse gear position for energizing the solenoid.

5. In a vehicle provided with a fluid pressure braking system, valve means for holding the brakes applied, said valve means including a member controlled by the action of gravity for causing the valve means to be operative, said member being controlled by the action of inertia during change in speed of the vehicle to cause the valve means to be inoperative, a solenoid, means operable by the solenoid when energized for causing said member to be inoperative notwithstanding the action of gravity tending to cause it to be operative, and an electrical circuit including a switch for energizing the solenoid.

6. In a vehicle provided with fluid pressure brake actuating system, valve means comprising a rolling ball actuated by gravity for preventing release of the brakes from applied position, said ball being held in an inoperative position by the action of inertia during deceleration of the vehicle, means comprising a solenoid for positively maintaining said ball in an inoperative position when said solenoid is energized, and an electrical circuit including a switch controlled by the operator of the vehicle for energizing the solenoid.

7. In a vehicle provided with a change speed gearing and with a fluid pressure brake actuating system, valve means comprising a rolling ball acted on by gravity for preventing release of the brakes from applied position, said ball being held in an inoperative position by the action of inertia during deceleration of the vehicle, means comprising a solenoid when energized for positively maintaining said ball in an inoperative position, an electrical circuit including a switch for energizing the solenoid, and means for closing the switch when the gearing is in a selected position.

8. In a vehicle provided with fluid pressure brake actuating mechanism, a clutch mechanism and a change speed gearing, valve means comprising a rolling ball for preventing release of the brakes from applied position when the vehicle is facing upward on an ascending grade, a connection between the clutch mechanism and the valve means to cause said valve to be open when the clutch is engaged and permitting said valve to be closed when the clutch is disengaged, means comprising a solenoid for holding the ball in an inoperative position notwithstanding the disengaging of the clutch, an electrical circuit including a switch for energizing the solenoid, and means operative when the change speed gearing is in reverse speed position for closing said switch.

9. In a vehicle provided with a braking mechanism, a change speed gearing and means whereby power may be caused to be applied to the vehicle wheels at the will of the operator, means for preventing release of the brakes from applied position, means operable when power is not being applied to the wheels of the vehicle for permitting the release preventing means to be operable and when power is being applied to the vehicle wheels for causing the release preventing means to be inoperable, means comprising a solenoid for causing the brake release preventing means to be inoperative notwithstanding power is not being applied to the vehicle wheels, an electrical circuit including a switch for energizing said solenoid, and means for closing the switch and energizing said solenoid only when the change speed gearing is in reverse gear position.

10. In a vehicle provided with a change speed gearing and with a fluid pressure brake actuating system, valve means for holding the brakes applied and comprising a member controlled by the action of gravity for causing the valve means to be operative and by the action of inertia during deceleration of the vehicle for causing the valve means to be inoperative, a solenoid, an additional member controlled by the solenoid for governing the operativeness and inoperativeness of the valve means, an electrical circuit including a switch for energizing the solenoid, and means for controlling said switch by an element of the change speed gearing so that said valve means will be inoperative when the gearing is in reverse gear position.

CLARENCE V. GARDINER.